Jan. 12, 1943.   A. Y. DODGE   2,307,881
ONE-WAY CLUTCH AND BEARING
Filed Aug. 9, 1941

INVENTOR
ADIEL Y. DODGE
By Dawson Ooms & Booth
ATTORNEYS

Patented Jan. 12, 1943

2,307,881

UNITED STATES PATENT OFFICE 2,307,881

ONE-WAY CLUTCH AND BEARING

Adiel Y. Dodge, Rockford, Ill.

Application August 9, 1941, Serial No. 406,137

8 Claims. (Cl. 192—45)

This invention relates to a one-way clutch and bearing and more particularly to a construction for reducing frictional resistance to relative rotation in one direction while positively locking the parts against relative rotation in the opposite direction.

Combined clutch and bearing structures have heretofore been proposed, incorporating both friction elements for reducing frictional drag, and gripper elements for holding the parts against relative rotation. These devices have, in general, been relatively complicated, requiring either the provision of cages to support the bearing and gripper parts, or of relatively complex spring devices for holding the parts tightly in assembled position.

It is one of the objects of the present invention to provide a one-way clutch and bearing which is extremely simple and inexpensive to construct and yet which is highly efficient in operation.

Another object of the invention is to provide a one-way clutch and bearing structure in which the bearing elements and the gripper elements operate on different surfaces.

Still another object of the invention is to provide a one-way clutch and bearing in which the necessity for a cage structure is eliminated, and the parts are held in proper assembled position by a simple leaf spring.

The above and other objects, advantages and novel features of the invention will be apparent from the following description when read in connection with the accompanying drawing, in which.

Figure 2:
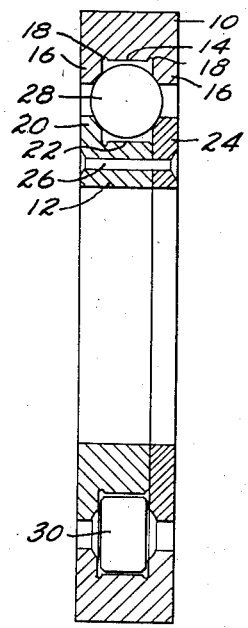
Figure 2 is a section at right angles to Figure 1.
Figure 1:
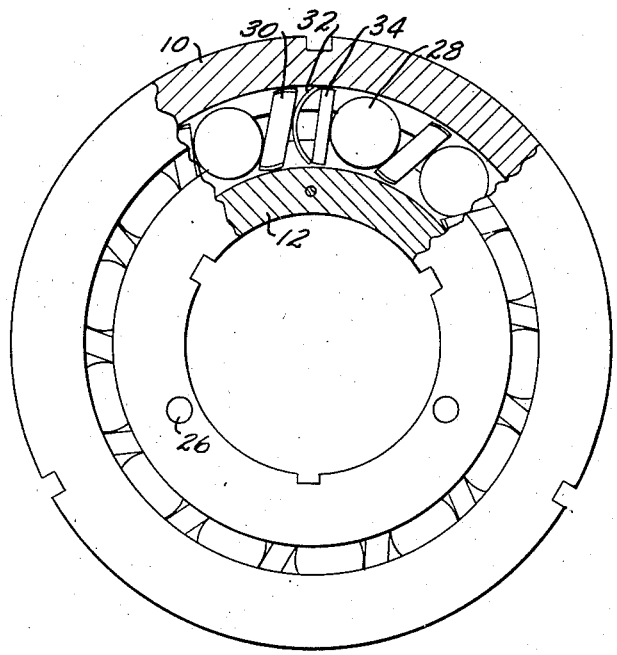
Figure 1 is a side elevation of a one-way clutch and bearing embodying the invention, with parts broken away and in section.

The structure shown in Figures 1 and 2 comprises an outer ring 10 and an inner ring 12, arranged coaxially and in the same plane. The outer ring has its central portion cut away, as indicated at 14, to form a central annular surface defined by parallel spaced flanges 16. The surface 14 is preferably machined or ground smooth, and may be cut away at its corners, as indicated at 18, to enable proper machining and to form grooves for the free passage of lubricant. The inner ring 12 is formed at one side with a flange 20, similar to the flanges 16, and has a ground annular surface 22 for cooperation with gripper elements as explained later. A separate flange ring 24 is secured to the opposite face of the ring 12 by means of fastenings such as rivets 26.

The edge surfaces of the several flanges 16, 20 and 24 are formed to provide rolling surfaces for bearing balls 28, which rest on the flanges and connect the rings for free relative rotation. It will be noted that due to the manner of support of the bearing balls, the balls tend to resist thrust loads as well as to carry radial loads.

Between the balls 28 there are arranged a series of gripper elements 30, of substantially rectangular shape and having their ends formed on arcs with spaced centers. The elements 30 normally lie at angles to radii through the center of the rings, as shown, and when tilted in this position, will permit clockwise rotation of the outer ring relative to the inner ring. If the outer ring should attempt to turn counter-clockwise relative to the inner ring, the gripper elements will be rocked to a more nearly radial position and will bind against the surfaces 14 and 22 to hold the inner and outer rings against rotation.

It will be noted that the gripper elements and bearing balls are loosely mounted between the rings and are held in place by the flanges on the rings. In order to hold the balls and grippers tightly against each other for proper operation, resilient means are provided between one of the gripper elements and an adjacent ball to urge them apart. According to the present invention, this resilient means comprises an arcuate leaf spring 32 of substantially rectangular section, so as to fit between the flanges 16 and 20 and 24. As shown in Figure 1, the spring 32 is arranged with its convex side engaging a gripper element and a block member 34 engages the concave side of the spring and the adjacent bearing ball 28. Thus, the spring acts to press apart the gripper element and bearing ball at one point in the annular series so as to maintain the balls and gripper elements in contact throughout the remainder of the series. While only one resilient means has been shown, it will be understood that more than one could be provided, if desired.

Figure 3:
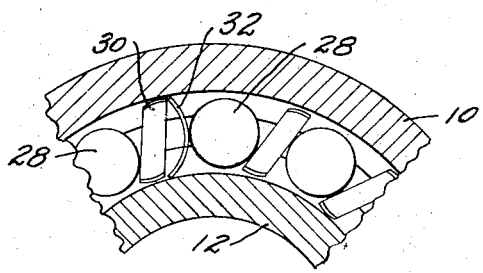
Figure 3 is a partial section similar to Figure 1, showing an alternative construction.

The construction of Figure 3 is substantially similar in most respects to that of Figures 1 and 2, and parts therein corresponding to like parts in Figures 1 and 2 have been indicated by the same reference numerals. In this construction, the leaf spring 32 is turned in the opposite direction and the block member 34 is omitted. Thus, the concave side of the spring engages a gripper element 30, while its convex side presses against the adjacent bearing ball 28.

In both embodiments the edges of the races 22 may be chamfered adjacent the rings 24 and the edges of the grippers 30 may also be chamfered as shown. The combination of this construction with the grooves 18 provides passages for the flow of lubricant completely around the annulus so that both the bearing balls and the grippers will be adequately lubricated at all times. Even in periods of rest the lubricant will be retained in these passages and between the flanges 16, 20 and 24 so that frequent additions of lubricant are not necessary.

While two embodiments of the invention have been shown and described in detail, it will be understood that these are illustrative only, and are not to be taken as a definition of the scope of the invention, reference being had for this purpose to the appended claims.

What is claimed is:

1. A one-way clutch and bearing comprising a pair of coaxial, coplanar rings, said rings being formed on their facing surfaces with central peripheral grooves defined by spaced parallel flanges, bearing balls riding on said flanges connecting the rings for relative rotation, but limiting relative axial movement thereof, and gripper members lying in said grooves and confined by the flanges.

2. A one-way clutch and bearing comprising a pair of coaxial, coplanar rings, said rings being formed on their facing surfaces with central peripheral grooves defined by spaced parallel flanges, bearing balls riding on said flanges connecting the rings for relative rotation but limiting relative axail movement thereof, and gripper members arranged alternately with the balls, the ends of said gripper members lying in the grooves and being confined by said flanges.

3. A one-way clutch and bearing comprising a pair of coaxial, coplanar rings, said rings being formed on their facing surfaces with central peripheral grooves defined by spaced parallel flanges, bearing balls riding on said flanges connecting the rings for relative rotation but limiting relative axial movement thereof, gripper members arranged alternately with the balls, the ends of said gripper members lying in the grooves and being confined by said flanges, and resilient means between one of the gripper members and an adjacent ball and urging them apart.

4. A one-way clutch and bearing comprising a pair of coaxial, coplanar rings, said rings being formed on their facing surfaces with central peripheral grooves defined by spaced parallel flanges, bearing balls riding on said flanges connecting the rings for relative rotation but limiting relative axial movement thereof, gripper members arranged alternately with the balls, the ends of said gripper members lying in the grooves and being confined by said flanges, an arcuate leaf spring arranged with its ends in the grooves and engaging one of the gripper members on one side, and a block member engaging the other side of the leaf spring and one of the balls, the spring urging said one of the gripper members and said one of the balls apart.

5. A one-way clutch and bearing comprising a pair of coaxial, coplanar rings, bearing elements loosely mounted between the rings and connecting them for relative rotation, gripper elements loosely mounted between the rings and alternating with the bearing elements, and resilient means between two adjacent elements for urging them apart, said resilient means including an arcuate leaf spring extending substantially radially between the rings, with its convex side engaging a gripper element, and a block member engaging the concave side of the spring and a bearing element.

6. A one-way clutch and bearing comprising a pair of coaxial, coplanar rings, bearing elements loosely mounted between the rings and connecting them for relative rotation, gripper elements loosely mounted between the rings and alternating with the bearing elements, and resilient means between two adjacent elements for urging them apart, said resilient means including an arcuate leaf spring extending substantially radially between the rings, with its concave side engaging a gripper element and its convex side engaging a bearing element.

7. A one-way clutch and bearing comprising a pair of coaxial, coplanar rings formed on their facing surfaces with central peripheral grooves defined by spaced parallel flanges, and with lubricant conducting grooves adjacent said flanges, bearing balls riding on said flanges connecting the rings for relative rotation, grippers arranged alternately with the bearing balls the ends of said gripper elements lying in the grooves and being confined by said flanges, and resilient means between one of the gripper members and an adjacent bearing ball urging them apart.

8. A one-way clutch and bearing comprising a pair of coaxial, coplanar rings, bearing elements loosely mounted between the rings and connecting them for relative rotation, gripper elements loosely mounted between the rings with their centers in substantially the same axial plane as the bearing elements and alternating with the bearing elements, and resilient means loosely mounted between two adjacent elements for urging them apart and held in position by engagement with the rings and with adjacent bearing and gripper elements, said resilient means including an arcuate leaf spring of less arcuate extent than a semi-circle and arranged with its chord extending substantially radially between the rings.

ADIEL Y. DODGE.